United States Patent Office 2,813,110
Patented Nov. 12, 1957

2,813,110

11-OXYGENATED-12-HALO-17-ETHYNYL-17-HYDROXY-4-ANDROSTEN-3-ONES

Frank B. Colton, Chicago, and Edwin J. Strojny, Skokie, Ill., assignors to G. D. Searle & Co., Chicago, Ill., a corporation of Delaware No Drawing. Application June 7, 1956,
Serial No. 589,882

7 Claims. (Cl. 260—397.45)

The present invention relates to a new class of halogenated steroids which are substituted at position 17 by an unsaturated aliphatic hydrocarbon radical. It is particularly concerned with 12-haloandrostene derivatives which can be represented by the structural formula

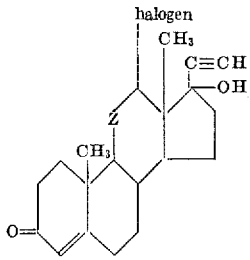

wherein Z can represent a carbinol (CHOH) group or a carbonyl (C=O) group. The compounds of this invention consequently include the 11,17-dihydroxy-12-halo-17-ethynyl-4-androsten-3-ones of the general formula

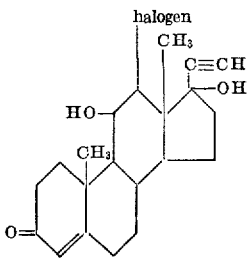

and the 12-halo - 17 - ethynyl-17-hydroxy-4-androstene-3,11-diones of the genral formula

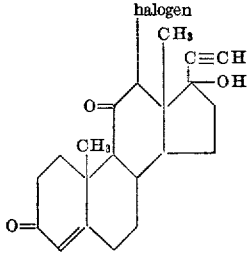

In the preferred embodiments of this invention the halogen atom designated in the foregoing structural representations is fluorine, chlorine, or bromine.

A starting material suitable for the manufacture of compositions of this invention is 11β-hydroxy-12α-bromo-4-androstene-3,17-dione. This is the same compound described by Meystre and Wettstein in Helvetica Chimica Acta, 32, 1978 (1949), and designated (page 1980) as XIII and (page 1988) as bromohydrin XIII. By treatment of this compound in refluxing ethanol with potassium acetate there is obtained the epoxide, 11,12-epoxy-4-androstene-3,17-dione. This epoxide is converted to the 3-enol ethyl ether which, upon treatment with acetylene in the presence of an alkali metal alkoxide such as potassium tert.-amylate, followed by acidic hydrolysis of the reaction product, yields 11,12-epoxy-17α-ethynyl-17β-hydroxy-4-androsten-3-one. This compound is then treated with a hydrogen halide such as hydrogen fluoride, hydrogen chloride, or hydrogen bromide, whereupon there is obtained an 11β,17β-dihydroxy-12α-halo-17α-ethynyl-4-androsten-3-one as described in greater detail hereinafter.

The 12α-halo-17α-ethynyl-17β-hydroxy-4 - androstene-3,11-diones of this invention are obtained by subjecting the corresponding 11β,17β - dihydroxy - 12α - halo - 17α-ethynyl-4-androsten-3-ones to oxidation by an oxidizing reagent comprising chromium trioxide in pyridine or chromium trioxide in acetic acid, followed by isolation of the resulting oxidized product.

The compositions of the present invention have useful pharmacological properties, and are particularly valuable for the hormonal effects which they can elicit. In particular, they are potent progestational agents.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

A solution of 10 parts of 11β-hydroxy-12α-bromo-4-androstene-3,17-dione in 520 parts of ethanol is mixed with 35 parts of potassium acetate and heated under reflux in a nitrogen atmosphere for 2 hours. Water is added, with chilling and stirring, until separation of the organic reaction product is complete. This insoluble product is dissolved by extraction with ethyl acetate, and the ethyl acetate solution is washed with several small portions of water and concentrated to dryness under reduced pressure. The non-volatile residue thus obtained is crude 11,12-epoxy-4-androstene-3,17-dione, suitable for subsequent operations without further purification.

Example 2

A stirred mixture of 4 parts of 11,12-epoxy-4-androstene-3,17-dione, 6 parts of ethyl orthoformate, 0.5 part of anhydrous ethanol and 100 parts of purified dioxane is treated with 0.2 part of concentrated sulfuric acid and maintained at about 25° C. for 30 minutes. Pyridine (1 part) is then added, followed by water to cause separation of the insoluble reaction product. After chilling to effect complete separation, this product is collected, washed with water, dried, and crystallized from anhydrous ethanol containing a trace amount of pyridine to yield 3 - ethoxy - 11,12 - epoxy - 3,5-androstadien-17-one which has an infrared absorption maximum at 5.8 microns and an ultraviolet absorption maximum at 242 millimicrons with a molecular extinction coefficient of about 18,500.

Example 3

To a solution of potassium tert.-amylate prepared from 4 parts of potassium, 250 parts of tert.-amyl alcohol and 35 parts of toluene there is added a mixture of 4 parts of 3-ethoxy-11,12-epoxy-3,5-androstadien-17-one in 70 parts of toluene, and the resulting reaction mixture, maintained at about 0° C., is treated over a period of about 24 hours by the introduction of a stream of acetylene. The mixture is then diluted with several times its volume of water, acidified with dilute hydrochloric acid, and extracted with several portions of ether. The combined ethereal extract is washed with water and concentrated to dryness. A solution of the residue thus obtained in a minimum quantity of methanol at room temperature is rendered distinctly acidic by the addition of aqueous hydrochloric acid and allowed to stand for 8 hours, after which most of the methanol is removed by distillation under reduced pressure. The remaining mixture is diluted with several times its volume of water, and the insoluble product is collected and washed with water. By crystallization of this crude product from a mixture of ethyl acetate and petroleum ether there is obtained 11,12- epoxy - 17α - ethynyl - 17β - hydroxy - 4 - androsten-3-one which has infrared absorption maxima at about 2.8, 3.0, 6.0 and 6.2 microns. An ultraviolet absorption maximum appears at 240 millimicrons, with a molecular extinction coefficient of about 17,000. This compound has the structural formula

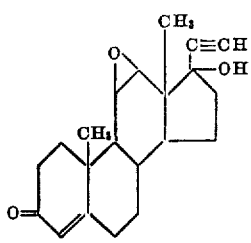

*Example 4*

To a solution of 2.5 parts of 11,12-epoxy-17α-ethynyl-17β-hydroxy-4-androsten-3-one in 400 parts of purified dioxane is added 100 parts of 2.5 molar hydrochloric acid, and the mixture is allowed to stand at about 25° C. for 30 minutes. Water is then gradually added, with stirring and chilling, until the reaction product separates from solution. This product is collected, washed with aqueous dioxane and water, and crystallized from a mixture of ethyl acetate and petroleum ether. There is thus obtained 11β,17β - dihydroxy - 12α - chloro - 17α - ethynyl-4-androsten-3-one, which has infrared absorption maxima at about 2.8, 3.0, 6.0 and 6.2 microns, and an ultraviolet absorption maximum at 240 millimicrons with a molecular extinction coefficient of about 16,500.

*Example 5*

By the procedure of Example 4, with the employment of 100 parts of 2.5 molar hydrobromic acid in place of the hydrochloric acid, there is obtained 11β,17β-dihydroxy-12α-bromo-17α-ethynyl-4-androsten-3-one.

*Example 6*

A chilled solution of 1 part of 11,12-epoxy-17α-ethynylβ - hydroxy - 4 -androsten - 3 - one in 10 parts of acetic acid and 10 parts of propionic acid is treated with 40 parts of 52% aqueous hydrofluoric acid and maintained at about −20° C. for 4 hours, after which it is partitioned between ethyl acetate and saturated sodium bicarbonate solution, with the employment of sufficient sodium bicarbonate solution to neutralize all of the acidic components of the original reaction mixture. The ethyl acetate phase is washed with additional sodium bicarbonate solution and then with several small portions of water, after which it is dried and concentrated under reduced pressure. By crystallization of the residue from a mixture of acetone and petroleum ether, there is obtained 11β,17β - dihydroxy - 12α - fluoro - 17α - ethynyl-4-androsten-3-one which has infrared absorption maxima at about 2.8, 3.0, 6.0 and 6.2 microns. Th ultraviolet absorption spectrum shows a maximum at 240 milli-microns with a molecular extinction coefficient of about 16,500.

*Example 7*

An oxidizing reagent is prepared by adding a total of 5 parts of chromium trioxide in small portions to 100 parts of pyridine, maintained at about 25–30° C. during the period of addition by the use of external cooling as required. To this oxidizing reagent there is added a solution of 5 parts of 11β,17β-dihydroxy-12α-fluoro-17α-ethynyl-4-androsten-3-one in 150 parts of pyridine, and the resulting mixture is allowed to stand, with intermittent agitation, for about 18 hours. The mixture is then diluted with several times its volume of water and extracted with ethyl acetate. The filtered ethyl acetate solution is washed with dilute hydrochloric acid and with several portions of water, after which it is concentrated to dryness under reduced pressure. The residue is crystallized from a mixture of ethyl acetate and petroleum ether, whereby there is obtained 12α-fluoro-17α-ethynyl-17β-hydroxy-4-androstene-3,11 - dione. This compound has infrared absorption maxima at about 2.8, 3.0, 5.9, 6.0 and 6.2 microns, and an ultraviolet absorption maximum at 238 millimicrons with a molecular extinction coefficient of about 16,500.

*Example 8*

By the procedure of Example 7, with the substitution of 5 parts of 11β,17β-dihydroxy-12α-bromo-17α-ethynyl-4-androsten-3-one for the 11β,17β-dihydroxy-12α-fluoro-17α-ethynyl-4-androsten-3-one, there is obtained 12α-bromo-17α-ethynyl-17β-hydroxy-4-androsten-3,11-dione.

*Example 9*

A stirred solution of 4 parts of 11β,17β-dihydroxy-12α-chloro - 17α - ethynyl - 4-androsten-3-one in 300 parts of acetic acid, maintained at about 10–12° C., is treated by the gradual addition of a solution of 4 parts of chromium trioxide, 8 parts of water and 30 parts of acetic acid. After the period of addition of the chromium trioxide solution, which can amount to about 15 minutes, the mixture is maintained at 10–20° C. for an additional 2 hours and then stirred with a solution of 12 parts of sodium sulfite in 200 parts of water. It is then evaporated almost to dryness in a stream of air, and the wet, solid residue is stirred with 200 parts of water until no more will dissolve. The insoluble product which remains is collected on a filter, washed with water, and crystallized from a mixture of ethyl acetate and petroleum ether to afford 12α - chloro - 17α-ethynyl-17β-hydroxy-4-androstene-3,11-dione which has an ultraviolet absorption maximum at 238 millimicrons with a molecular extinction coefficient of about 16,500. Infrared absorption maxima appear at 2.8, 3.0, 5.9, 6.0 and 6.2 microns.

What is claimed is:

1. A compound of the structural formula

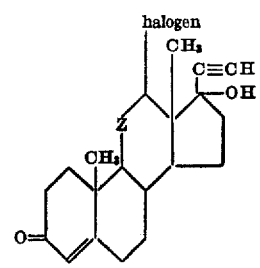

wherein Z is a member of the class consisting of carbinol and carbonyl groups.

2. 11β,17β - dihydroxy - 12α-halo-17α-ethynyl-4-androsten-3-one.

3. 11β,17β - dihydroxy - 12α - chloro-17α-ethynyl-4-androsten-3-one.

4. 11β,17β - dihydroxy - 12α - fluoro-17α-ethynyl-4-androsten-3-one.

5. 12α - halo - 17α - ethynyl-17β-hydroxy-4-androstene-3,11-dione.

6. 12α - chloro-17α-ethynyl-17β-hydroxy-4-androstene-3,11-dione.

7. 12α - fluoro-17α-ethynyl-17β-hydroxy-4-androstene-3,11-dione.

References Cited in the file of this patent
UNITED STATES PATENTS

| | | |
|---|---|---|
| 2,492,191 | Sarett | Dec. 27, 1949 |
| 2,683,153 | Kendall | July 6, 1954 |
| 2,702,811 | Colton | Feb. 22, 1955 |
| 2,740,798 | Ralls | Apr. 3, 1956 |

UNITED STATES PATENT OFFICE
Certificate of Correction

Patent No. 2,813,110                                    November 12, 1957

Frank B. Colton et al.

It is hereby certified that error appears in the printed specification of the above numbered patent requiring correction and that the said Letters Patent should read as corrected below.

Column 1, line 48, for "genral" read —general—; column 3, line 59, for "ethynylβ-" read —ethynyl-17β-—; column 4, line 52, for "17α-ethynyl-" read —17α-ethynyl-—; same column 4, lines 60 to 70, claim 1, should appear as shown below instead of as in the patent:

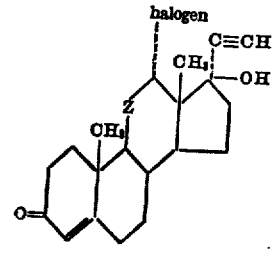

Signed and sealed this 25th day of February 1958.

[SEAL]

Attest:
KARL H. AXLINE,
*Attesting Officer.*

ROBERT C. WATSON,
*Commissioner of Patents.*